United States Patent [19]
Lipschutz

[11] 3,795,122
[45] Mar. 5, 1974

[54] STEERING-SHAFT LOCK FOR AUTOMOTIVE VEHICLES

[75] Inventor: Paul Lipschutz, Croissy-sur-Seine, France

[73] Assignee: Societe d'Exploitation des Brevets Neiman, Neuilly S/Seine, France

[22] Filed: Apr. 3, 1972

[21] Appl. No.: 240,409

[30] Foreign Application Priority Data
Apr. 13, 1971 France .............................. 7112876

[52] U.S. Cl. ................................................. 70/182
[51] Int. Cl. ............................................ B60r 25/02
[58] Field of Search ..... 70/182, 183, 184, 185, 186, 70/188, 252

[56] References Cited
FOREIGN PATENTS OR APPLICATIONS
576,781   4/1946   Great Britain ........................ 70/185
1,240,060   7/1960   France ............................... 70/185

*Primary Examiner*—Joseph H. McGlynn
*Assistant Examiner*—Richard P. Tremblay
*Attorney, Agent, or Firm*—A. C. Nolte, Jr.; Edward B. Hunter; C. Bruce Hamburg

[57] ABSTRACT

In an automotive vehicle, a lock for a steering shaft surrounded by a steering-column tube formed endwise with an inner restriction and carrying said lock which comprises a lock-bolt radially movable through a hole provided in the tube to engage in the extended locking position a stop dog secured to said shaft and having a radial size such that the maximum diametral dimension of said shaft and dog assembly is smaller than the diameter of said inner restriction of said tube.

6 Claims, 5 Drawing Figures

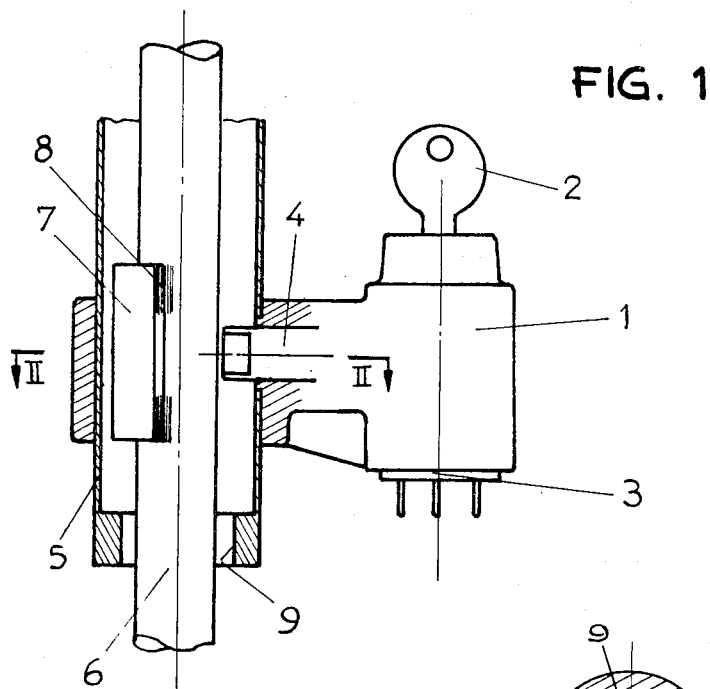
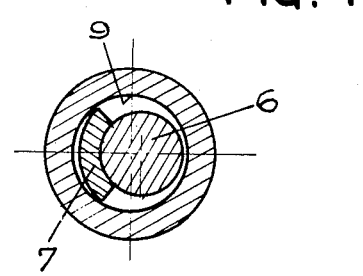
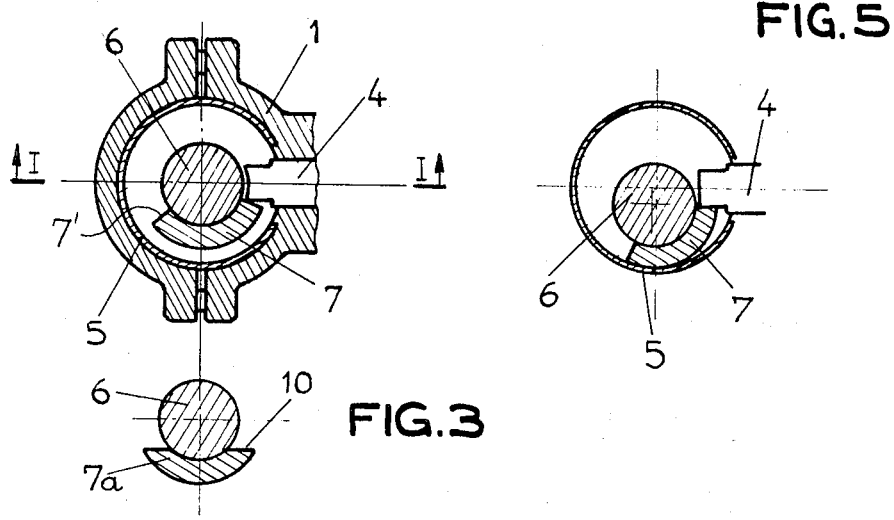

STEERING-SHAFT LOCK FOR AUTOMOTIVE VEHICLES

The present invention relates generally to anti-theft or anti-joy ride devices for locking the steering-wheel shaft or spindle or like control rod on the steering gear; more particularly, it is directed to such a locking device of the kind removably secured onto the steering-column tube, jacket or casing forming the hollow shell surrounding or enclosing the steering pillar, mast or post, said device comprising a retractable lock-bolt which is radially movable to co-operate in its outward extended locking position with a keeper member forming a bolt-clasp or like latch-catch integral with or rigidly secured to the steering-wheel spindle for locking same against rotation.

In a locking arrangement of this kind, the bolt-clasp or latch-catch consists of a slot or like aperture or notch provided in a hollow sleeve or like tubular socket surrounding the steering-wheel spindle, and rigidly secured as by welding thereto. In the case where the tube surrounding the steering-wheel spindle or shaft and forming the steering-column comprises a restriction at least at one end thereof for mounting a holder ring or bushing or like ball-bearing cage, collar or retainer forming a guide bearing to support the steering shaft, said cylindrical sleeve or socket may have an outer diameter too large for entering or being received and accommodated within the tube or for moving past the restriction i.e., through the narrower portion of the tube bore when inserting the steering-wheel spindle provided with its sleeve through the tube upon mounting the steering shaft. A main object of the invention is therefore to avoid such a drawback. To solve much a technical problem, the solution proposed by the invention consists essentially in substituting for the cylindrical collar or sleeve which is welded, brazed or riveted onto the steering-wheel spindle, a fraction of a ring which does not cover the whole periphery of said spindle, this fraction acting as a stop dog engageable in abutting relationship with the lock-bolt upon extension of the latter through a side hole provided through the wall of the steering-column tube. Thus the angular amplitude available for operating the steering-wheel is very reduced in the operative locking position of the lock-bolt and does not allow for a proper steering of the vehicle.

The invention will be better understood and further objects, characterizing features, details and advantages thereof will appear more clearly when reading the following description with reference to the accompanying diagrammatic drawings given by way of example only, illustrating several forms of embodiment of the invention and wherein:

FIG. 1 shows a view partially in longitudinal section taken upon the line I—I of FIG. 2 and illustrating the assembly comprising a portion of the steering-column tube and of the steering-wheel shaft as well as the locking device together with its associated arrangement according to the invention;

FIG. 2 is a fragmentary view in cross-section through the longitudinal centre line of the lock-bolt, taken upon the line —II of FIG. 1;

FIG. 3 is a cross-sectional detail view of an alternative embodiment showing a modification of the cylindrical shell portion forming the stop dog;

FIG. 4 is a cross-section showing the steering-wheel spindle when moving past a restricted portion of the steering-column 2 tube surrounding same; and FIG. 5 is a cross-section of the device shown in the locked position in the condition where a torque is applied to the steering-wheel.

With reference to the drawings, FIG. 1 shows the locking device 1 together with its operating key 2, its electric switch 3 and its lock-bolt 4 illustrated in the outward extended locking position.

Onto the steering-wheel shaft 6 is secured the stop dog 7 which is preferably welded thereto outside of the operative area directly engageable with the lock-bolt, i.e., for example at 8, at the upper and lower end portions of said shell-like stop-dog. There is also seen at 9 a restricted portion of the bore of the steering-column tube 5 which portion is for example formed of an annular shoulder and would prevent the passage of the conventional cylindrical slotted sleeve forming the aforesaid bolt-clasp secured to the steering shaft upon insertion thereof into the steering-column tube.

In FIG. 2, the stop-dog 7 is in engagement with the lock-bolt 4 of the locking device in the locking position. This stop-dog 7 is in the shape of a shell portion consisting of a cylindrical ungula or like cylindrical ring portion substantially coaxial with the steering shaft 6 and having its longitudinal opposite terminal end faces 7' lying in two intersecting meridian planes, respectively, extending through the axis of revolution of said steering shaft 6, so that the lock-bolt 4 engages the adjacent face 7' with a reduced surface area formed for instance of an end corner edge or angle ridge of the lock-bolt. Such a limited contact of the lock-bolt with the inclined face 7' may be conductive to a tendency of said face to escape the lock-bolt under the reaction force produced by a bending strain or any relative displacement of the steering shaft due to the rotation or twist applied thereto through operation of the steering-wheel.

FIG. 3 shows an alternative embodiment adapted to remove such an inconvenience and wherein the stop-dog 7a has its end side faces or lips 10 extending in parallel relation to a meridian plane of the steering-column tube 5 or lying in a same plane parallel to the centre line of the steering shaft, the stop-dog being then formed of a segment of a cylindrical ring or hollow cylinder.

In FIG. 4, it is seen that the assembly consisting of the steering shaft 6 and of the stop-dog 7 may pass into the bore of reduced diameter 9 of the steering-column tube upon displacing the axis of the steering shaft eccentrically with respect to that of the steering-column tube 5.

FIG. 5 shows that even under a bending strain of the steering shaft 6 due to a torque transmitted by the steering wheel to said shaft, an effective locking action is achieved, the stop-dog 7 bearing then at the same time against the lock-bolt 4 and against the inner wall surface of the steering-column tube 5.

It is to be understood that the present invention should not be construed as being limited to the embodiments described and shown herein as many modifications and changes may be resorted to by those who are skilled in the art without departing from the scope and gist of the invention as defined in the appended claims.

What is claimed is:

1. In a vehicle including a rotary steering spindle and a steering-column tube surrounding said spindle, said tube being formed with a hole extending through the wall of said tube and with a restricted inner bore portion towards at least one end of said tube, an anti-theft device for locking said steering-spindle, removably secured to said steering-column tube and comprising a retractable lock-bolt movable substantially radially through said hole of said tube in its extended locking position and a bolt-catch formed of a cylindrically curved latch-plate member rigidly secured to said spindle in partially coaxially surrounding relationship therewith and engageable with said lock-bolt in the extended locking position thereof, the aggregate size of said spindle and bolt-catch assembly being such that the combined steering-spindle and latch-plate member can slip through said restricted inner bore portion, wherein the improvement consists in that said latch-plate member forms a stop-dog, said latch-bolt being sidewise engageable in abutting relationship with either end side edge of said latch-plate member, the circumferential extent and relative angular position of said latch-plate member with respect to that of said lock-bolt being such as to allow a limited rotary motion of said steering-spindle in either direction when said lock-bolt is in its extended operative locking position, each one of the opposite end side edges of said latch-plate member being defined by a substantially flat face lying in a meridian plane extending through the axis of revolution of said steering-spindle.

2. A device according to claim 1, wherein the circumferentical extent of said latch-plate member is less than one half of the circumferential of said steering-spindle.

3. A device according to claim 1, wherein said steering-spindle is resiliently flexible for moving upon being twisted near the inner wall of said steering column tube so that said stop-dog simultaneously engages both of said tube and said lock-bolt.

4. In a vehicle including a rotary steering spindle and a steering-column tube surrounding said spindle, said tube being formed with a hole extending through the wall of said tube and with a restricted inner bore portion towards at least one end of said tube, an anti-theft device for locking said steering-spindle, removably secured to said steering-column tube and comprising a retractable lock-bolt movable substantially radially through said hole of said tube in its extended locking position and a bolt-catch formed of a cylindrically curved latch-plate member rigidly secured to said spindle in partially coaxially surrounding relationship therewith and engageable with said lock-bolt in the extended locking position thereof, the aggregate size of said spindle and bolt-catch assembly being such that the combined steering-spindle and latch-plate member can slip through said restricted inner bore portion, wherein the improvement consists in that said latch-plate member forms a stop-dog, said latch-bolt being sidewise engageable in abutting relationship with either end side of said latch-plate member, the circumferential extend and relative angular position of said latch-plate member with respect to that of said lock-bolt being such as to allow a limited rotary motion of said steering spindle in either direction when said lock-bolt is in its extended operative locking position, both of the end side edges of said latch-plate member being defined by substantially flat faces, respectively, located in a same plane extending in substantially parallel relation to the axis of revolution of said steering-spindle.

5. A device according to claim 4 wherein the circumferential extent of said latch-plate member is less than one half of the circumference of said steering-spindle.

6. A device according to claim 4 wherein said steering spindle is resiliently flexible for moving upon being twisted near the inner wall of said steering-column tube so that said stop-dog simultaneously engages both of said tube and said lock-bolt.

* * * * *